(12) United States Patent
Rudolph

(10) Patent No.: US 6,588,992 B2
(45) Date of Patent: Jul. 8, 2003

(54) HOLE SAW

(75) Inventor: Scott Rudolph, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/777,305

(22) Filed: Feb. 6, 2001

(65) Prior Publication Data
US 2002/0106254 A1 Aug. 8, 2002

(51) Int. Cl.⁷ .................. B23B 51/05; B23D 57/00
(52) U.S. Cl. ........................ 408/204; 408/206
(58) Field of Search ................ 408/204, 206, 408/207, 209, 703, 223

(56) References Cited

U.S. PATENT DOCUMENTS

| 1,234,468 A | * | 7/1917 | Hamilton ............ 248/259 |
| 2,062,257 A | * | 11/1936 | Douglas et al. ....... 143/85 |
| 2,747,435 A | | 5/1956 | Burton |
| 2,794,469 A | | 6/1957 | Shortell |
| 3,609,056 A | | 9/1971 | Hougen |
| 3,648,508 A | | 3/1972 | Hougen |
| 4,179,967 A | | 12/1979 | Clark |
| 4,205,571 A | * | 6/1980 | Bertini ............... 83/661 |
| 4,573,838 A | * | 3/1986 | Omi et al. ........... 408/204 |
| 4,632,610 A | * | 12/1986 | Hougen .............. 408/204 |
| 4,727,788 A | | 3/1988 | Yoshida et al. |
| 4,802,396 A | | 2/1989 | Kuklinski |
| 4,813,324 A | | 3/1989 | Yoshida et al. |
| 4,827,822 A | | 5/1989 | Yoshida et al. |
| 5,094,135 A | | 3/1992 | Nakahara et al. |
| 5,410,935 A | | 5/1995 | Holston et al. |
| 5,697,935 A | * | 12/1997 | Moran et al. ......... 606/104 |
| 5,803,678 A | * | 9/1998 | Korb et al. .......... 408/206 |
| 5,832,803 A | | 11/1998 | Hayden, Sr. |
| 6,158,324 A | | 12/2000 | Kullmann et al. |
| 6,167,792 B1 | | 1/2001 | Korb et al. |
| 6,220,139 B1 | | 4/2001 | Kobayashi et al. |

FOREIGN PATENT DOCUMENTS

| DE | 2624370 C3 | 8/1979 |
| WO | WO 96/29173 | 9/1996 |
| WO | WO 97/00749 | 1/1997 |

* cited by examiner

Primary Examiner—Henry W. H. Tsai
(74) Attorney, Agent, or Firm—Harness, Dickey & Pierce, P.L.C.

(57) ABSTRACT

A hole saw having a cylindrical shape includes a plurality of repetitive groups of saw teeth. The repetitive groups include a first inboard set tooth and a first outboard set tooth. The inboard set tooth is displaced a distance greater than the outboard set tooth. Each repetitive group further includes taller straight teeth. The set teeth have a smaller back angle and a longer shoulder than the straight teeth.

31 Claims, 2 Drawing Sheets

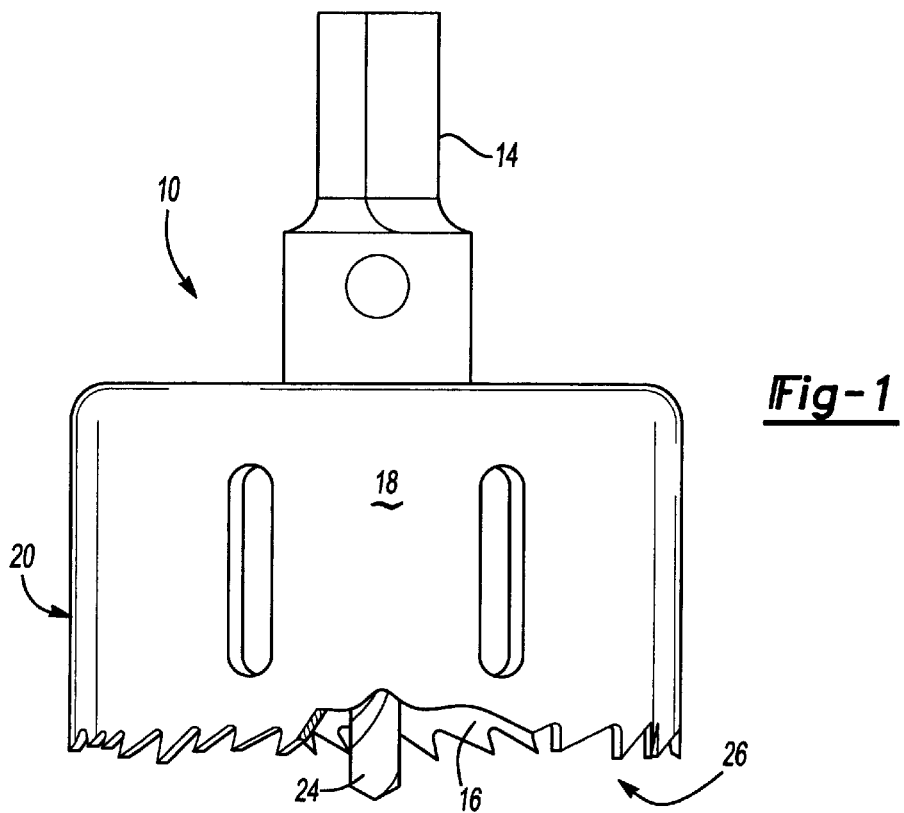
Fig-1
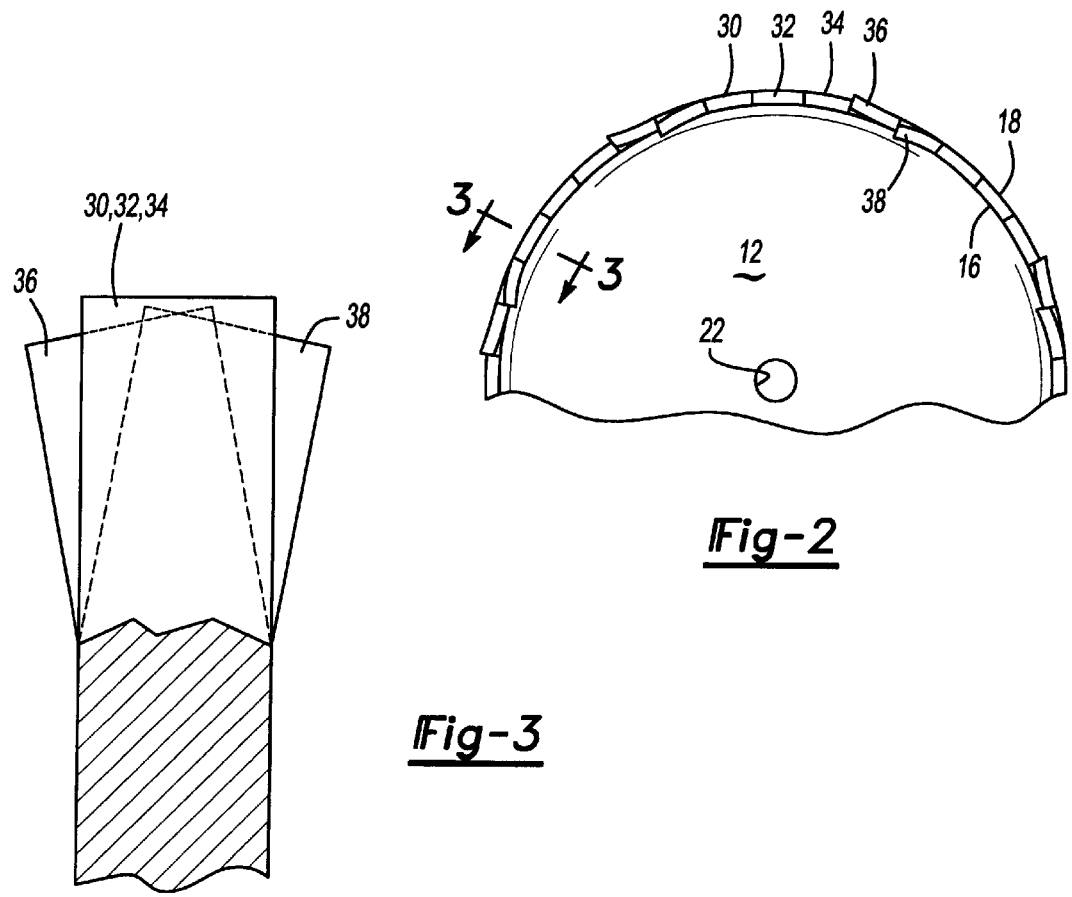
Fig-2
Fig-3

HOLE SAW

FIELD OF THE INVENTION

The present invention relates generally to saw blades, and more particularly to a hole saw having an improved tooth configuration.

BACKGROUND

A hole saw is a drill accessory that allows a user to make circular cut-outs in a material such as wood, steel, fiberglass, plastic, etc. Hole saws generally range in size from five-eighths of an inch to six inches in diameter, but are mostly utilized for drilling holes larger than 1-inch in diameter. Typically, hole saws are adapted to be used with a drill press or power drill.

Historically, the main components of a conventional hole saw include a saw cup, an arbor and a pilot bit. The saw cup includes a threaded aperture to receive a threaded end portion of the arbor. The pilot bit protrudes from the cutting edge of the saw to guide the saw during cutting.

The saw cup generally includes a collection of teeth which are comprised of uniform size and orientation or may include repetitive groups of different size and orientation. While the available hole saws in the art have proven to operate in a generally satisfactory manner, areas for improvement exist. For example, it would be desirable to provide a hole saw having a tooth pattern and orientation which provides an improved cutting efficiency.

SUMMARY OF THE INVENTION

It is a general object of the present invention to provide a hole saw having an improved tooth arrangement and increased cutting efficiency.

These and other objects are obtained by providing a hole saw having teeth arranged in a plurality of repetitive groups, each group having an inboard set tooth, an outboard set tooth and at least one unset or straight tooth.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a side view of the hole saw, partially in section, according to the teachings of this invention.

FIG. 2 is a bottom plan view of the hole saw.

FIG. 3 is a sectional view taken along line 3—3 of FIG. 2; and

DETAILED DESCRIPTION OF THE PREFERRED EMBODIMENTS

Figure 4:
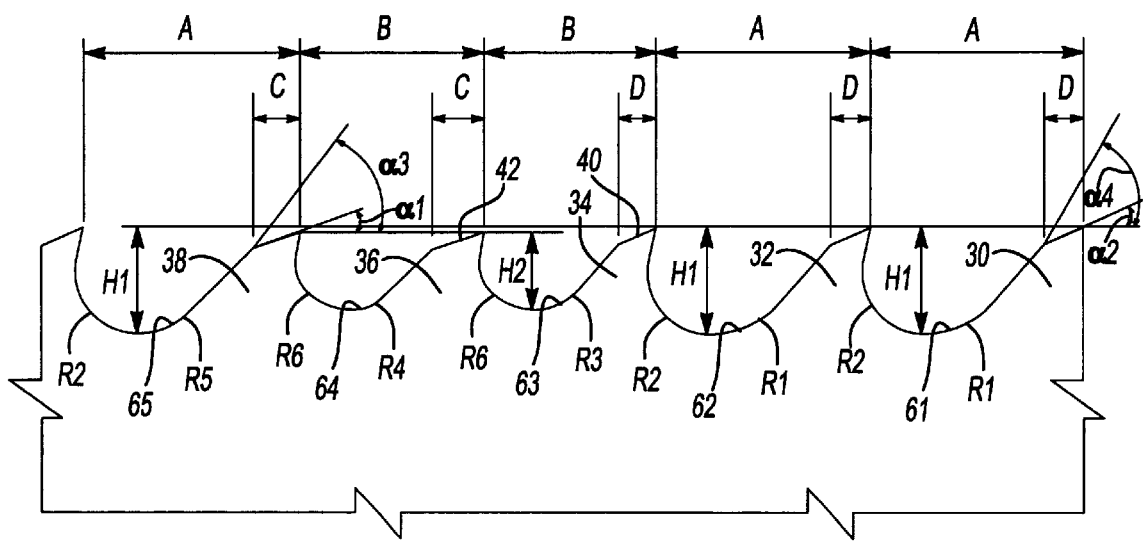
FIG. 4 is a side view of a tooth group laid flat for purposes of illustrating the tooth geometry of a tooth group.

With reference to the drawings, an improved hole saw is constructed in accordance with the teachings of the present invention and is identified with reference numeral 10 in FIG. 1. The hole saw 10 comprises a generally rigid cylindrical saw cup 20 having a closed end provided by a drive plate 12 adapted to be connected to an arbor 14. The saw cup 20 is preferably made of metal. The cup 20 is defined by an inner surface 16 and an outer surface 18. The arbor 14 provides a connection between the drill (not shown) and the drive plate 12. The arbor 14 includes a post (not shown) that is threaded to cooperate with aperture 22 to releasably couple the arbor 14 to the saw cup 20.

As is conventional, a pilot drill bit 24 centrally extends from aperture 22 in the drive plate 12 beyond the cutting edge 26 of the hole saw 10. The drill bit 24 serves to guide the hole saw 10 into contact with the work and to maintain the hole saw 10 in alignment during the initial phase of the cutting operation. The hole saw cutting edge 26 includes the tooth arrangement as shown in FIGS. 2 through 4.

With reference now to FIGS. 2 through 4, the saw tooth arrangement of the hole saw 10 will now be described in detail. The tooth pattern provided generally includes an arrangement of repetitive groups of saw teeth. Each group includes a first through third unset or straight tooth 30, 32, 34. The unset teeth 30, 32, 34 are followed by a set tooth 36 displaced (i.e. set) at an angle toward the outboard direction a predetermined distance. A second set tooth 38 is displaced at an angle toward the inboard direction a predetermined distance. The inboard set tooth 38 is displaced at a greater angle than the outboard set tooth 36. According to a preferred embodiment of the present invention, the outboard set tooth 36 is set outward approximately ten one-thousandths of an inch while the inboard trailing tooth 38 is set inward approximately fifteen one-thousandths of an inch.

It is within the scope of the invention that the sequential order of set teeth may be interchangeable whereby the inboard set tooth 38 or the outboard set tooth 36 may come first in cut order. Similarly, the unset or straight teeth 30, 32 and 34 may be arranged such that one or more unset teeth may occur between the set teeth 36, 38 in cut order.

According to the preferred embodiment of the present invention, each of the unset teeth has the same height and each of the set teeth have the same height. Explained further, the distance from the lowermost point of each unset tooth to the tips of each unset tooth is generally equidistant, while similarly, the lowermost point of each set tooth to the tips of each set tooth is generally equidistant. Preferably, the unset teeth 30, 32, 34 are taller than the set teeth 36, 38. The taller unset teeth 30, 32, 34 are the primary cutting teeth and they tend to track the saw blade along the cutting path. The set teeth 36, 38 are shorter to keep them out of the cutting plane. The straight teeth are equally spaced and have generally the same gullet area since they are all doing the same job.

As best seen in FIG. 4, the unset teeth 30, 32, 34 are spaced a distance "A" from one another while the set teeth 36, 38 are spaced a smaller distance "B" from one another. The set teeth are provided with a upper back angle a1 that is smaller than the upper back angle a2 of the unset teeth. In addition, the back shoulder 42 of the set teeth 36, 38 extend a further distance "C" than a distance "D" of shoulder 40 of the unset teeth. The set teeth 36, 38 also have a lower back angle a3 which is lower than the lower back angle a4 of the unset teeth 30, 32, 34. The gullet height H1 of each of the straight teeth is larger than the gullet height H2 of each of the set teeth 36, 38. In addition, the primary (R1) and secondary (R2) radius of curvature are larger for the straight teeth 30, 32, 34 than for the set teeth 36, 38. In particular, for a preferred embodiment of the present invention, the height of the straight (unset) teeth is approximately 3.6 mm and the height of the set teeth is approximately 2.8 mm. The upper back angle a2 of the straight teeth is approximately 25° while the upper back angle al of the set teeth is approximately 20°. The lower back angle a4 of the straight teeth is approximately 50° while the lower back angle a3 of the set teeth is approximately 45°. The pitch distance "A" between the straight teeth 30, 32, 34 is approximately 7 mm while the pitch distance "B" between the set teeth 36, 38 is approximately 5.7 mm. The length of the shoulder "D" of the straight teeth 30, 32, 34 is approximately 1.27 mm while the length of the shoulder "C" of the set teeth is approximately 1.6 mm. The primary and secondary radius of curvature R1, R2, respectively, of the first and second gullets 61, 62 are approximately 2.82 mm and 2.15 mm. The primary radius of curvature R3 of the third gullet 63 is approximately 2.22 mm, the primary radius of curvature R4 of the fourth gullet 64 is approximately 1.23 mm and the primary radius of curvature R5 of the fifth gullet 65 is approximately 1.57 mm. The secondary radius of curvature R6 of the third and fourth gullets 63, 64 is approximately 1.66 mm and the secondary radius of curvature R2 of the fifth gullet 65 is 2.15 mm.

The hole saw of the present invention provides an improved, more efficient cut. The inwardly and outwardly set teeth 36, 38 provide for easier removal of the hole saw from the hole being cut by making the hole wider than the outer surface 18 of the cylindrical body and allow for easier removal of the plug from the hole saw by cutting the outer surface of the plug to be smaller than the inner surface 16 of the cylindrical body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cutting tool comprising:
   a cylindrical body;
   a plurality of identical repetitive tooth groups disposed sequentially along an edge of said cylindrical body, each tooth group having fewer than six teeth including a plurality of straight teeth and a plurality of set teeth;
   one of said plurality of set teeth having a radial offset at a predetermined distance in an outboard direction; and
   a second of said plurality of set teeth having a radial offset at a predetermined distance in an inboard direction;
   wherein the predetermined inboard distance is greater than the predetermined outboard distance.

2. The cutting tool of claim 1, wherein said plurality of straight teeth of each tooth group are of equivalent height.

3. The cutting tool of claim 1, wherein said plurality of set teeth are of equivalent height.

4. The cutting tool of claim 1, wherein said plurality of straight teeth includes three straight teeth.

5. The cutting tool of claim 1, wherein said plurality of set teeth have a smaller back angle than said plurality of straight teeth.

6. The cutting tool of claim 1, wherein said plurality of set teeth have a longer shoulder than said plurality of straight teeth.

7. The cutting tool of claim 1, wherein said plurality of straight teeth are taller than said plurality of set teeth.

8. The cutting tool of claim 1, wherein said plurality of straight teeth are spaced further apart than said plurality of set teeth.

9. The cutting tool of claim 1, wherein said plurality of set teeth have an upper back angle and a lower back angle which are lower than an upper back angle and a lower back angle, respectively, of said plurality of straight teeth.

10. The cutting tool of claim 1, wherein said plurality of set teeth have an upper back angle of approximately 20° and a lower straight section having a lower back angle of approximately 45°.

11. The cutting tool of claim 10, wherein said plurality of straight teeth have a back shoulder having an upper straight section having an upper back angle of approximately 25° and a lower straight section having a lower back angle of approximately 50°.

12. A culling tool, comprising:
    a cylindrical body;
    a plurality of identical repetitive tooth groups disposed sequentially along an edge of said cylindrical body, each tooth group having fewer than six teeth including a plurality of straight teeth and a plurality of set teeth, one of said plurality of set teeth having a radial offset in an outboard direction and a second of said plurality of set teeth having a radial offset in an inboard direction, said plurality of set teeth having a back angle that is smaller than a back angle of said plurality of straight teeth.

13. The cutting tool of claim 12, wherein said one of said plurality of set teeth offset in an outboard direction is offset further than said second of said plurality of set teeth offset in said inboard direction.

14. The cutting tool of claim 12, wherein said plurality of straight teeth include at least three straight teeth.

15. The cutting tool of claim 12, wherein said plurality of straight teeth are taller than said plurality of set teeth.

16. The cutting tool of claim 12 wherein said plurality of set teeth have a longer shoulder than said plurality of straight teeth.

17. The cutting tool of claim 12, wherein said plurality of set teeth are of equivalent height.

18. The cutting tool of claim 12, wherein said plurality of straight teeth are of equivalent height.

19. The cutting tool according to claim 12, wherein said plurality of set teeth have a back shoulder having an upper straight section having an upper back angle of approximately 20° and a lower straight section having a lower back angle of approximately 45°.

20. The cutting tool according to claim 19, wherein said plurality of straight teeth have a back shoulder having an upper straight section having an upper back angle of approximately 25° and a lower straight section having a lower back angle of approximately 50°.

21. A culling tool comprising:
    a cylindrical body;
    a plurality of identical repetitive tooth groups disposed sequentially along an edge of said cylindrical body, each tooth group having fewer than six teeth including at least one straight tooth and a plurality of set teeth, one of said plurality of set teeth having a radial offset in an outboard direction and a second of said plurality of set teeth having a radial offset in an inboard direction, said plurality of set teeth having a back shoulder having an upper straight section having an upper back angle and a lower straight section having a lower back angle greater than said upper back angle, said upper back angle being smaller than a back angle of said at least one straight tooth.

22. The cutting tool of claim 21, wherein each tooth group includes a plurality of straight teeth.

23. The cutting tool of claim 21, wherein said at least one straight tooth is taller than said plurality of set teeth.

24. The cutting tool of claim 21, wherein said plurality of set teeth have a longer shoulder than said at least one straight tooth.

25. The cutting tool according to claim 21, wherein said upper back angle of said set teeth is approximately 20° and said lower back angle of said set teeth is approximately 45°.

26. The culling tool according to claim 25, wherein said at least one straight tooth has a back shoulder having an upper straight section having an upper back angle of approximately 25° and a lower straight section having a lower back angle of approximately 50°.

27. A culling tool, comprising:

a cylindrical body;

a plurality of identical repetitive tooth groups disposed sequentially along an edge of said cylindrical body, each tooth group having fewer than six teeth including a plurality of straight teeth each having an equivalent height and a plurality of set teeth each having an equivalent height and being shorter than said straight teeth, wherein said plurality of straight teeth are spaced further apart than said plurality of set teeth.

28. The cutting tool of claim 27, wherein said plurality of set teeth have a longer shoulder than said plurality of straight teeth.

29. The cutting tool of claim 27, wherein said plurality of set teeth have a smaller back angle than said plurality of straight teeth.

30. The cutting tool according to claim 27, wherein said plurality of set teeth have a back shoulder having an upper straight section having an upper back angle of approximately 20° and a lower straight section having a lower back angle of approximately 45°.

31. The culling tool according to claim 30, wherein said plurality of straight teeth have a back shoulder having an upper straight section having an upper back angle of approximately 25° and a lower straight section having a lower back angle of approximately 50°.

* * * * *